(12) United States Patent
Etkin et al.

(10) Patent No.: US 8,441,620 B2
(45) Date of Patent: May 14, 2013

(54) DETERMINING DISTANCE BETWEEN NODES

(75) Inventors: Raul Hernan Etkin, San Francisco, CA (US); Erik Ordentlich, San Jose, CA (US); Michael Renne Ty Tan, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 517 days.

(21) Appl. No.: 12/754,027

(22) Filed: Apr. 5, 2010

(65) Prior Publication Data

US 2011/0242522 A1    Oct. 6, 2011

(51) Int. Cl.
*G01C 3/08* (2006.01)

(52) U.S. Cl.
USPC ......... 356/5.01; 356/3.01; 356/4.01; 356/4.1; 356/5.1

(58) Field of Classification Search .......... 356/3.01–3.1, 356/4.01–4.1, 5.01–5.1, 6–22, 28, 28.5
See application file for complete search history.

(56) References Cited

U.S. PATENT DOCUMENTS

| 2008/0144020 | A1* | 6/2008 | Nichols et al. ........... 356/139.01 |
| 2009/0237639 | A1* | 9/2009 | Shinozaki et al. ........... 356/4.01 |
| 2010/0323723 | A1* | 12/2010 | Gerstenberger et al. ... 455/456.5 |

FOREIGN PATENT DOCUMENTS

WO    2009110669    9/2009

\* cited by examiner

*Primary Examiner* — Luke Ratcliffe

(57) ABSTRACT

A first node in a wireless network transmits a periodic pilot signal to a second node. The second node receives the periodic pilot signal and retransmits the signal back to the first node. The retransmitted pilot signal includes a phase adjustment in view of an internal processing delay at the second node. The phase adjustment involves matching a phase of the retransmitted pilot signal to a phase of the received pilot signal. The first node measures a roundtrip delay of the pilot signal and the distance between the nodes is computed based at least on the measured roundtrip delay.

13 Claims, 5 Drawing Sheets

DETERMINING DISTANCE BETWEEN NODES

BACKGROUND

In many applications that involve a network of nodes (e.g., sensor node networks), node location information is very useful. One approach of determining a node's location is by triangulation, using the known location (e.g., GPS-based) of multiple anchor nodes as a reference.

BRIEF DESCRIPTION OF DRAWINGS

The following description includes discussion of figures having illustrations given by way of example of implementations of embodiments of the invention.

DETAILED DESCRIPTION

Location estimation by triangulation involves measuring distances among various nodes. These distances can be estimated by measuring the propagation delay of a signal assuming a known propagation speed on the corresponding medium. One approach to measuring propagation delay between two nodes (e.g., nodes A and B, respectively) is to measure the roundtrip delay of a signal. This can be accomplished by transmitting a pilot signal from node A, which is then reflected by node B, and the reflection is detected at node A. Reflected signals can potentially be weak; high power transmission, narrow beams, and/or very sensitive signal detectors can be used to combat signal weakness. Such solutions can introduce cost and complexity. In addition, if other reflective nodes are located near the target node B, multiple reflections may be received by node A, further complicating the delay estimation.

In various embodiments described herein, active optical signal retransmission at the target node is used instead of signal reflection to measure round trip delays. For convenience herein, various embodiments for determining location of nodes are described with reference to optical transmissions. In certain embodiments, the methods and systems described herein could be accomplished using other suitable transmission frequency spectrums (e.g., radio frequency, etc.).

Figure 1:
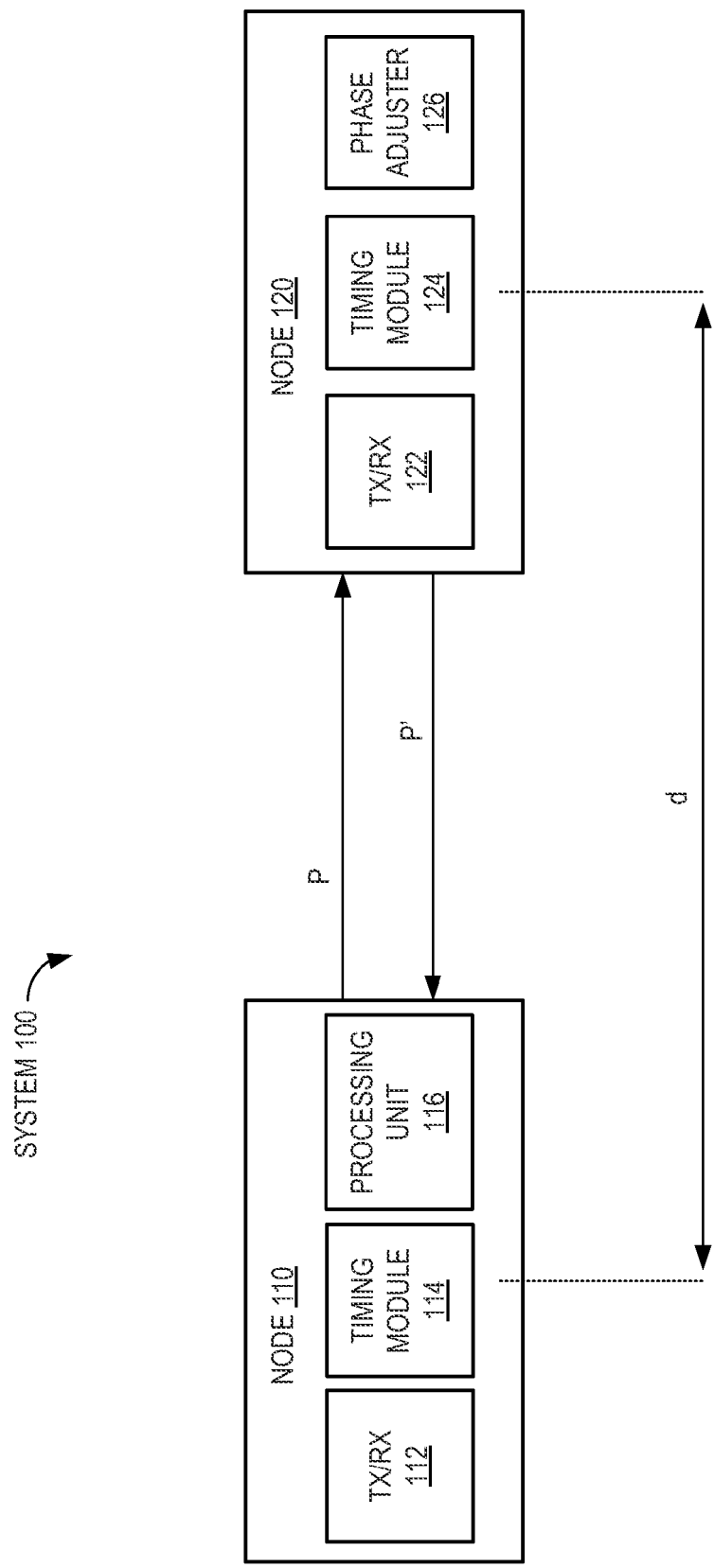
FIG. 1 is a block diagram illustrating a system according to various embodiments.

FIG. 1 is a block diagram illustrating a system according to various embodiments. Node 110 transmits an optical pilot signal P (e.g., a pseudo random sequence with good autocorrelation properties, such as a Gold sequence) where transmitter 112 uses, for example a light emitting diode (LED). The pilot signal P is received at the target node 120 by a receiver 122 (e.g., a photodetector such as a photodiode, phototransistor, etc.). Node 120 transmits P' back to node 110, where P' represents the retransmitted pilot signal. Node 110 detects the retransmitted signal P' via receiver 112. Timing module 114 measures the time elapsed between the transmission of P and the reception of P'. This delay may be measured, for example, by computing the correlation between P and P', possibly averaging the correlation over multiple measurements (or multiple periods of P and P', whenever they are periodic).

In an example, let $P_B(t)$ be the (baseband) signal received at node 120, and $P'_B(t)$ be the retransmitted (baseband) signal. To simplify the explanation, it is assumed that both $P_B(t)$ and $P'_B(t)$ are noiseless, periodic with period T, and have the same amplitude. If there is no compensation for the processing delay δ at node 120, $P'_B(t)=P_B(t-δ)$. In other words, $P'_B(t)$ is time shifted version of $P_B(t)$. In various embodiments, the retransmitted pilot $P'_B(t)$ is further delayed by a delay Δ, which can be controlled. After introducing this controlled delay Δ, the retransmitted pilot becomes $P'_B(t)=P_B(t-δ-Δ)$. Note that if $Δ=kT-δ$ (for any integer k), the periodicity of P results in $P'_B(t)=P_B(t-δ-Δ)=P_B(t-kT)=P_B(t)$. As a result, by introducing the appropriate additional delay Δ, the effects of the processing delay δ at node B can be eliminated or at least significantly mitigated.

The delay Δ can be adjusted via phase adjuster 126 which computes the correlation between $P'_B(t)$ and $P_B(t)$. Phase adjuster 126 (along with timing modules 114 and 124) can be implemented as one or more software modules, hardware modules, special-purpose hardware (e.g., application specific hardware, application specific integrated circuits (ASICs), embedded controllers, hardwired circuitry, etc.), or some combination of these. The pilot signal P is assumed to have an autocorrelation function that peaks at times t=kT for any integer k, though pilot signals with different properties could be used in different embodiments. By computing the correlation between $P'_B(t)$ and $P_B(t)$ and varying Δ until the correlation peaks, the optimal choice of Δ may be obtained.

The approach described above introduces an additional delay kT in the round trip delay calculation (i.e., the delay from the time that P is transmitted from node 110 until P' is received at node 110 from node 120), which results in a distance uncertainty kTc/2 in the distance estimate, where c is the speed of light. By choosing the period (T) of the pilot sequence (P) large enough so that Tc/2 is larger than the maximum distance ($d_{max}$) to be measured (e.g., by limitations of the signal power used), ambiguity in the distance estimates can be avoided. Alternatively, a coarse distance estimate based on other methods such as received signal level, one way delay, etc., may suffice to resolve any distance ambiguity by a multiple of Tc/2. For example, if the signal power used to transmit the pilot signal would result in a maximum distance ($d_{max}$) between nodes of one hundred fifty (150) meters, then a period $T≧(2×150 m)/(3×10^8 m/s)≧1$ μs would suffice to resolve any distance ambiguity by a multiple of Tc/2.

In the example above, once a sufficiently large period T has been selected (e.g., 1 μs if $d_{max}$ is less than or equal to 150 meters), then the distance d between node 110 and node 120 can be solved using $d=D(n)×c/2$, for some integer n where $D(n)=D+nT$ with T being the pilot sequence period and D being the delay at node 110 between the transmission of the pilot signal and the receiving of the retransmitted pilot signal as measured by the timing module 114. This leads to a set of possible solutions for d, one for each value of the integer n. The correct solution is the one where $0<d≦d_{max}$. Thus, by selecting the appropriate additional delay, an accurate determination of the distance between nodes 110 and 112 can be obtained.

Figure 2:
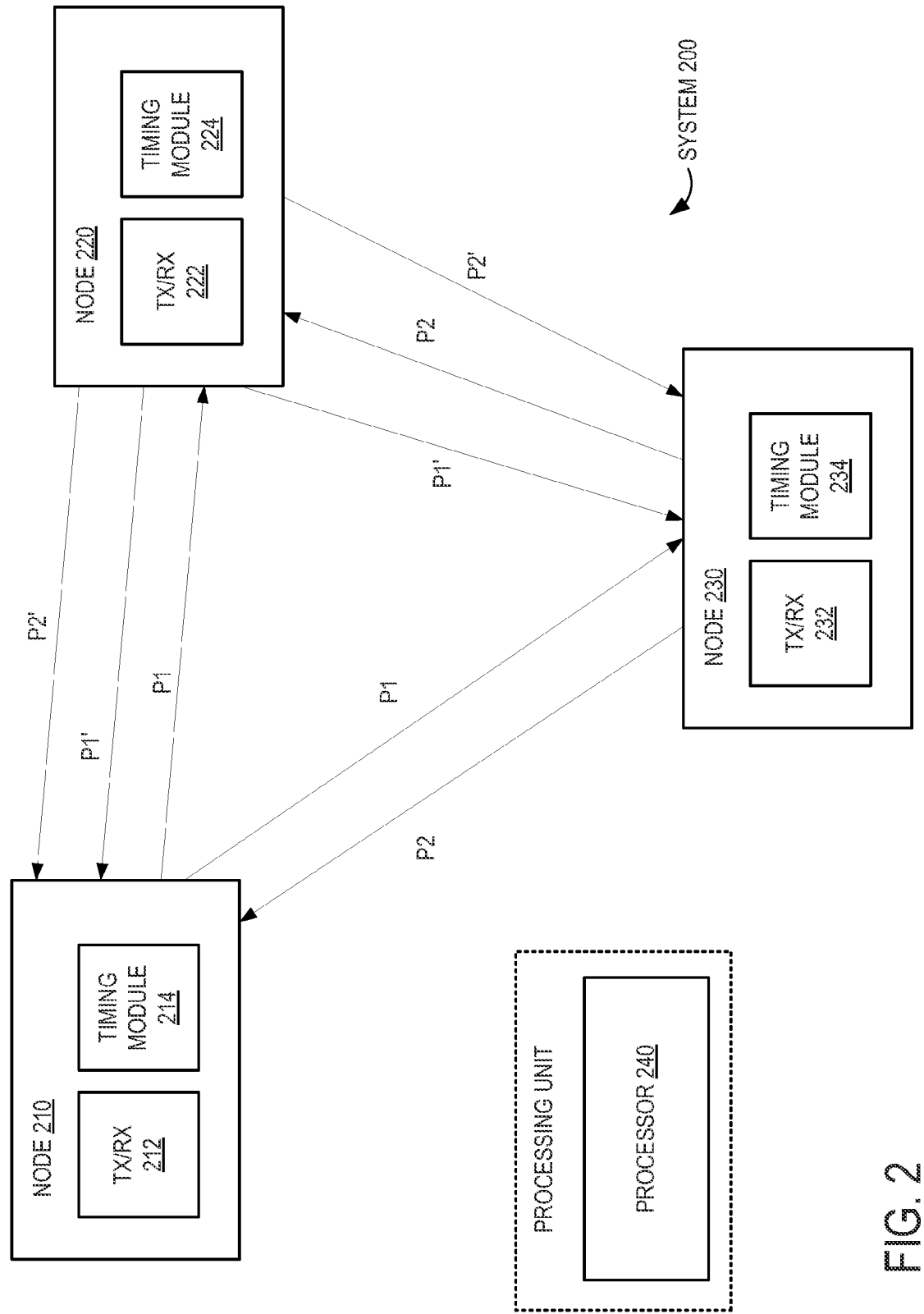
FIG. 2 is a block diagram illustrating a system according to various embodiments.

FIG. 2 is a block diagram illustrating a system according to various embodiments. System 200 includes a plurality of wireless nodes 210-230. As shown, each of nodes 210-230 includes a transmitter, receiver, and a timing module. In particular, node 210 includes transmitter/receiver 212 and timing module 214.

In an example of determining distances between nodes, transmitter 212 broadcasts a pilot signal (P1) to nodes 220 and 230 during a first stage. By "broadcasting" the pilot signal, it is understood that P1 is simultaneously transmitted to nodes 220 and 230. Upon receipt of P1, one of the receiving nodes, node 220 for example, retransmits (broadcasts) the pilot signal as P1' to nodes 210 and 230. Timing module 214 measures the delay between the transmission of P1 and the reception of P1'. Timing module 234 measures the delay between reception of P1 and reception of P1'. In various embodiments, delay measurements are independent of any timing synchronization between nodes. In other words, nodes need not be time-synchronized for the delay measurements to be useful. The various delay measurements are sent to a processing unit for processing by processor 240.

Similar to the process of node 210 transmitting P1 and node 220 retransmitting P1', a second pilot signal P2 is also transmitted (simultaneous broadcast) and retransmitted as P2' during a second stage, only P2 is transmitted by node 230 and retransmitted by node 220. By using a different combination of transmitting and retransmitting nodes, a different set of delay measurements may be obtained by respective timing modules. Again, the various delay measurements obtained during the second stage are sent to the processing unit for processing by processor 240.

As shown, the processing unit may be physically separate from any of the nodes. For example, the processing unit could be part of a central processing station that receives data to be processed from the various nodes. In such case, each node transmits (e.g., its delay measurements) to the processing unit. In other embodiments, the processing unit could be physically integrated with one of the nodes. For example, processor 240 could be located on node 210, 220, or 230. In yet other embodiments, the processing unit could be distributed (e.g., among nodes 210-230). Regardless of its location within system 200, the processing unit receives delay measurements from various nodes and processor 240 determines distance between nodes in view of the delay measurements and other information it may have about the system. The process for determining distance between nodes in view of delay measurements and other system information is described in more detail below.

Figure 3:
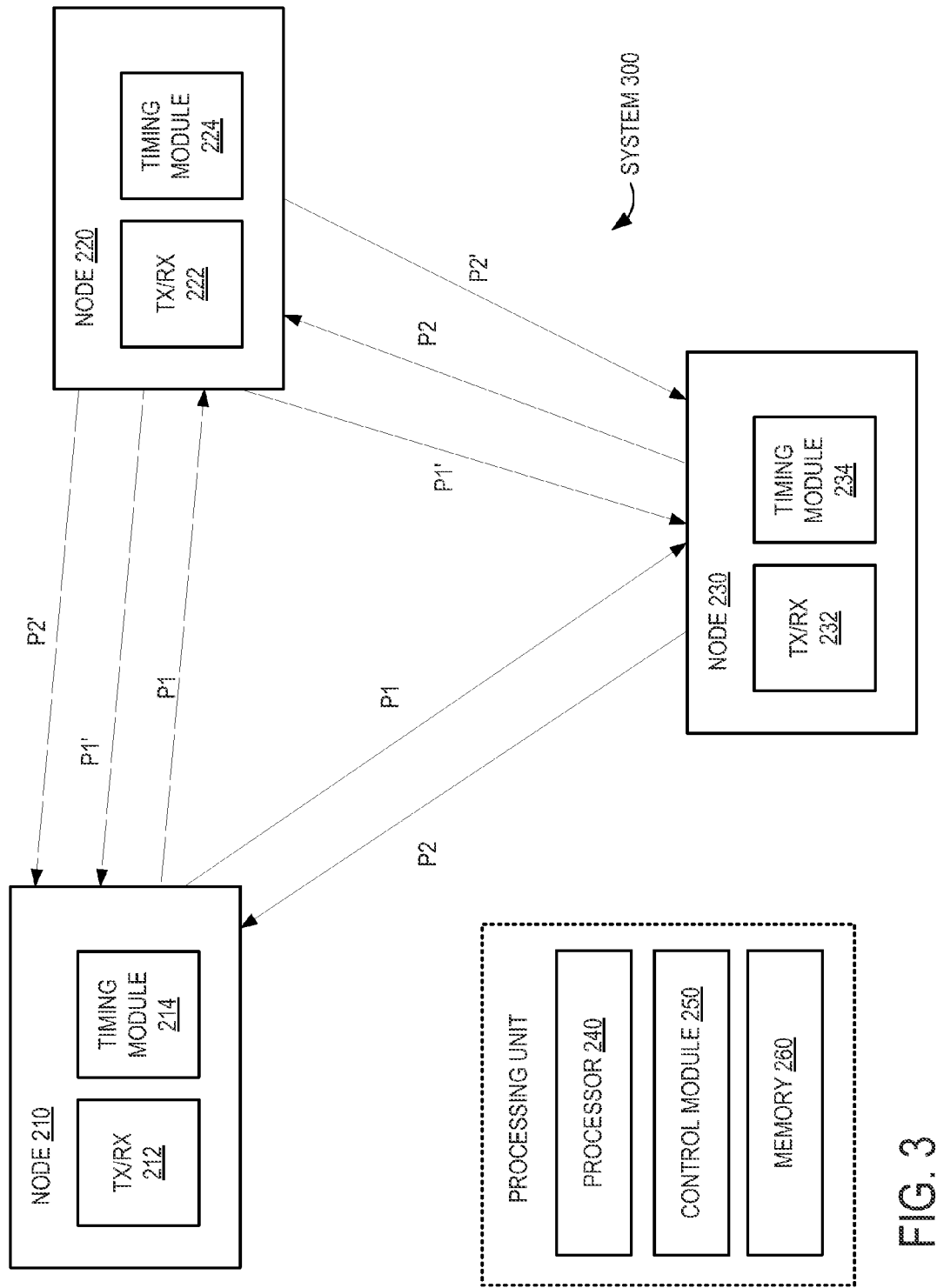
FIG. 3 is a block diagram illustrating a system according to various embodiments.

FIG. 3 is a block diagram illustrating a system according to various embodiments. In contrast to system 200, system 300 additionally includes a control module 250 in the processing unit. Control module 250 controls which nodes are to retransmit a received pilot signal to at least one node in system 300. For example, system 300 includes three nodes (210, 220, 230). Thus, control module may determine to use two transmission stages to collect time delay measurements for purposes of determining distance between nodes. In each stage, control module 250 selects one node to transmit a pilot signal and a different node to retransmit the pilot signal. Control module 250 may select a node for retransmission of a pilot signal according to various factors learned via the exchange of control messages between nodes including, but not limited to, available node power, proximity to control module 250, etc. Control module 250 may select a node for retransmission arbitrarily in certain embodiments.

Similar to system 200, the processing unit in system 300 may be located at a separate processing center (e.g., processing station, base station, etc.) or it may be located on one or more of the nodes in system 300. The various modules discussed herein may be implemented as one or more hardware modules, special-purpose hardware (e.g., application specific hardware, application specific integrated circuits (ASICs), embedded controllers, hardwired circuitry, etc.), or some combination of these. In addition, instructions to implement the described modules may be stored on a computer-readable storage medium (e.g., memory 260), executable via a processor (e.g., processor 240).

FIG. 3 further serves to illustrate the following example. For ease of description, let node 210 be node "A," let node 220 be node "B," and let node 230 be node "C." Accordingly, the transmission and reception of P1 and P1' yields various equations, where:

$d_{ij}$=distance between nodes $i$ and $j$ $D_{it}$=time delay measurement at node $i$ and stage $t$ $x_{it}$=unknown retransmission delay introduced at node $i$ and stage $j$ Thus, $d_{AB}$ represents the distance between nodes A (node 210) and node B (node 220). Assuming, that $d_{AB}$ is known and is thus part of the system information available to the processor 240, the distance between nodes B and C ($d_{BC}$) and the distance between node A and C ($d_{AC}$) can be estimated in two (2) stages. In various embodiments, the number of stages used to determine distances between nodes is a function of the number of nodes in the network and/or the number of unknown distances between nodes in the network.

In the first stage, node A transmits the pilot signal P1 to nodes B and C. Node B retransmits the pilot signal as P1' to nodes A and C. Node A measures the roundtrip delay between the transmission of P1 and the reception of P1', which is given by the equation:

$$D_{A1} = 2\left(\frac{d_{AB}}{c}\right) + x_{B1} \qquad (1)$$

where c is the speed of light. Node C measures the delay between the reception of P1 and the reception of P1', which is given by the equation:

$$D_{C1} = \left(\frac{d_{AB}}{c}\right) + x_{B1} + \left(\frac{d_{AB}}{c}\right) - \left(\frac{d_{AC}}{c}\right) \qquad (2)$$

In the second stage, node C transmits pilot signal P2 to nodes A and B. Node B then retransmits the pilot signal as P2' to nodes A and C. Thus, node C now measures the roundtrip delay between transmission of P2 and reception of P2', which is given by the equation:

$$D_{C2} = 2\left(\frac{d_{BC}}{c}\right) + x_{B2} \qquad (3)$$

Node A measures the delay between the reception of P2 and the reception of P2', which can be given the equation:

$$D_{A2} = \left(\frac{d_{BC}}{c}\right) + x_{B2} + \left(\frac{d_{AB}}{c}\right) - \left(\frac{d_{AC}}{c}\right) \qquad (4)$$

Accordingly, there are four (4) equations with unknowns $x_{B1}$, $x_{B2}$, $d_{BC}$, and $d_{AC}$, which can be solved to find the two unknown distances:

$$d_{AC} = (D_{A1} + D_{C2} - D_{A2} - D_{C1}) * (c/2) \quad (5)$$

$$d_{BC} = (2 * d_{AB} + D_{C1} + D_{C2} - D_{A1} - D_{A2}) * (c/2) \quad (6)$$

Thus, given the distance between nodes A and B as information about the system, a system according to the example above can determine the distance between nodes B and C and the distance between nodes A and C.

Figure 4:
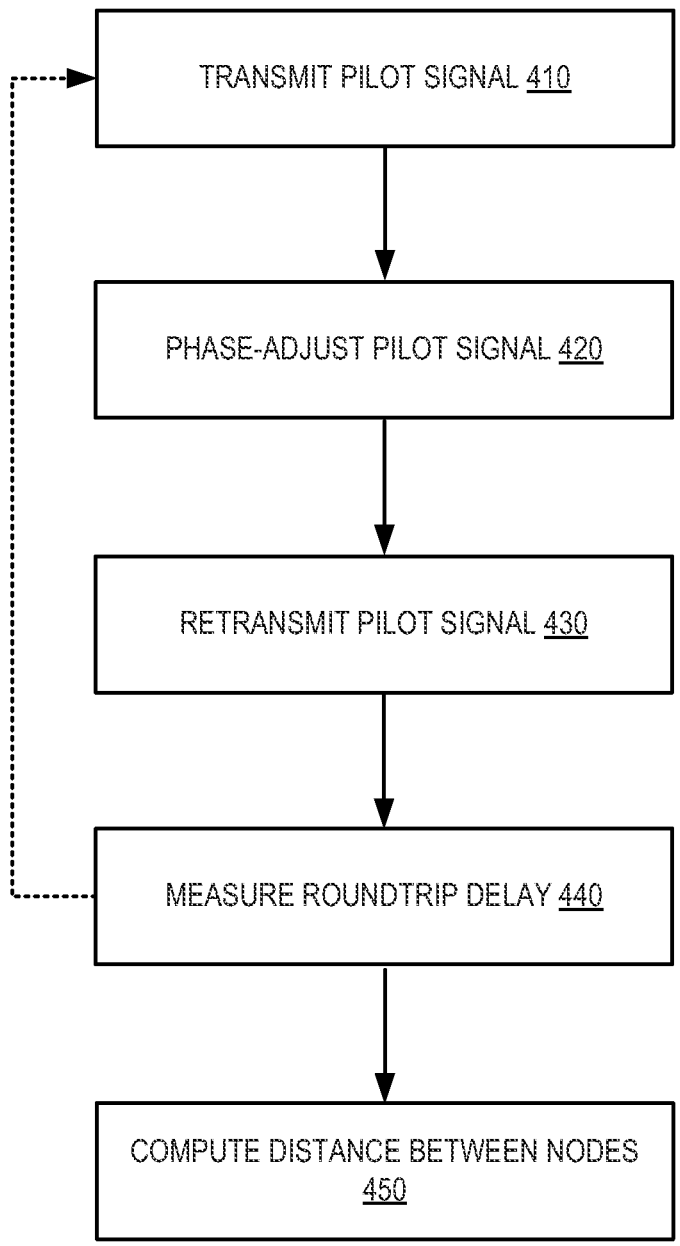
FIG. 4 is a flow diagram of operation in a system according to various embodiments.

FIG. 4 is a flow diagram of operation in a system according to various embodiments. FIG. 4 includes particular operations and execution order according to certain embodiments. However, in different embodiments, other operations, omitting one or more of the depicted operations, and/or proceeding in other orders of execution may also be used according to teachings described herein.

In a system of wireless nodes, one node transmits 410 a pilot signal to at least one other node. A node that receives the pilot signal retransmits 430 the pilot signal at least back to the node from which the pilot signal was received. In embodiments involving two nodes (where the pilot signal is periodic), the retransmitted pilot signal includes a phase adjustment 420 in view of an internal processing delay at the retransmitting node. Upon receiving the original pilot signal, a retransmitting node experiences some internal processing delay before being able to retransmit the pilot signal. As discussed above, by introducing an appropriate additional delay (e.g., phase-adjustment 420) at the retransmitting node, the retransmitted pilot can match the phase of the original pilot signal (e.g., via cross-correlation between the received original and retransmitted signals). If the period of the pilot signal is chosen to be sufficiently large, the roundtrip delay of the pilot signal can be measured 440 at the original transmitting node without ambiguity. Based at least in part on the measured roundtrip delay; the distance between the two nodes can be computed 450. As implied by the dotted line/arrow in FIG. 4, once the roundtrip delay has been measured 440, operations 410-440 may be repeated before computing 450 the distance between nodes.

Figure 5:
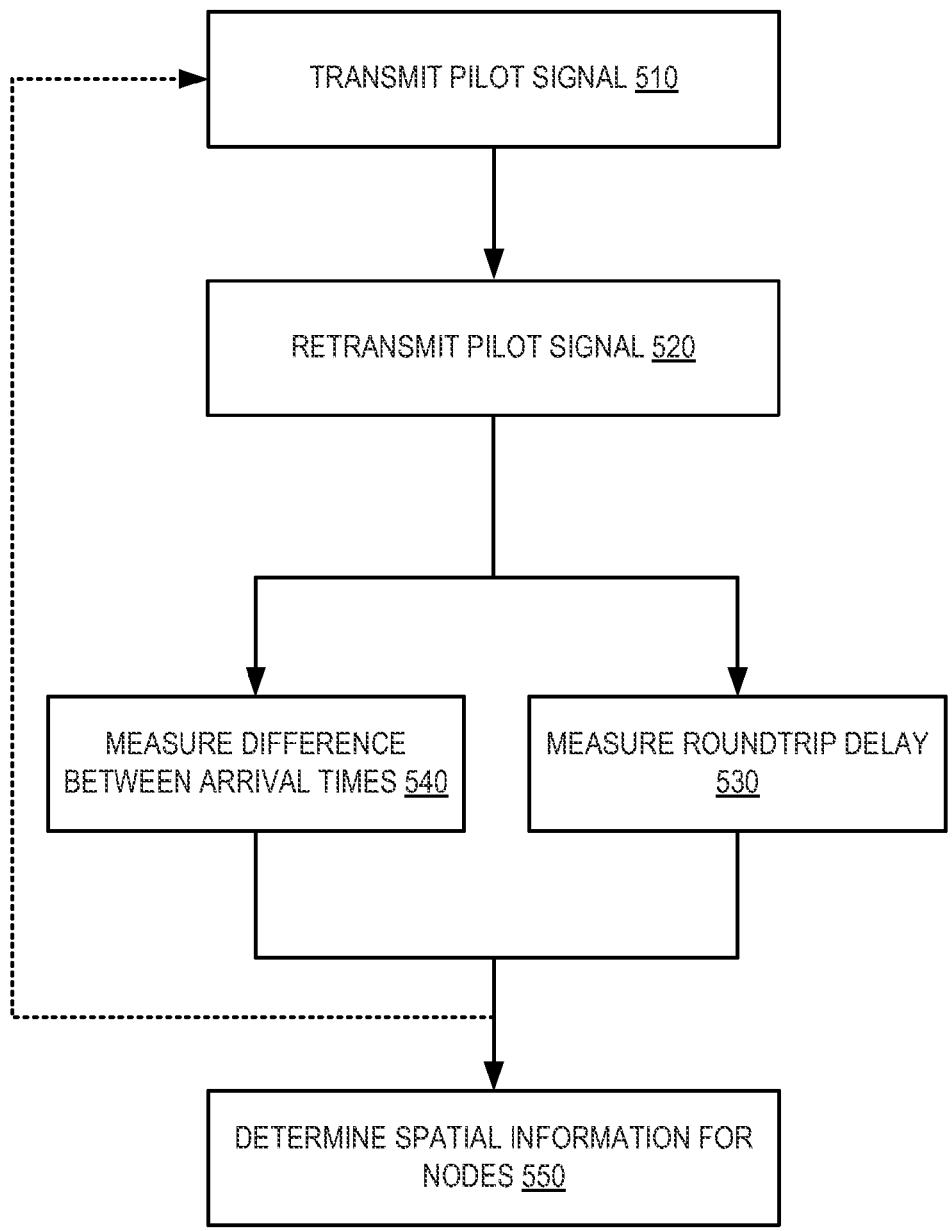
FIG. 5 is a flow diagram of operation in a system according to various embodiments.

FIG. 5 is a flow diagram of operation in a system according to various embodiments. FIG. 5 includes particular operations and execution order according to certain embodiments. However, in different embodiments, other operations, omitting one or more of the depicted operations, and/or proceeding in other orders of execution may also be used according to teachings described herein.

In a system of wireless nodes (e.g., 3 or more nodes), one node transmits 510 a pilot signal simultaneously (e.g., broadcasts) to at least two other nodes. One of the nodes that received the pilot signal retransmits 520 the pilot signal simultaneously to other nodes (including the node from which the pilot signal was originally transmitted). Upon receiving the original pilot signal, a retransmitting node experiences some internal processing delay before being able to retransmit the pilot signal. Upon receiving the retransmitted pilot signal, the original transmitting node measures 530 the roundtrip delay of the pilot signal. In embodiments involving more than 3 nodes in which two or more nodes different from the original transmitting node and the retransmitting node receive both signals, the original transmitting node need not measure the roundtrip delay.

Another node (or nodes in embodiments with more than 3 nodes) that was a receiver of both the originally transmitted pilot signal and the retransmitted pilot signal measures 540 the difference between arrival times of the two signals. As implied by the dotted line/arrow in FIG. 5, once the roundtrip delay has been measured 530 and the difference between arrival times has been measured 540, operations 510-540 may be repeated before determining 550 spatial information with respect to nodes (e.g., the distance between nodes, coordinate location of nodes, etc.), including different nodes taking different roles (e.g., transmitting, retransmitting, receiving, measuring, etc.). In various embodiments, the number of rounds and/or stages of performing operations 510-540 depends on the number of nodes and/or the number of unknown distances between nodes.

Several embodiments are discussed herein as facilitating the determination of distances between nodes. In alternate embodiments, the operations and techniques described herein may be used to determine node locations (e.g., in (X,Y) coordinates) in addition to or instead of distances between nodes. For example, when the number of nodes in the system/network is large, the use of coordinates instead of distances results in fewer unknown variables for which to solve.

The invention claimed is:

1. A method for determining location of nodes, comprising:
    transmitting a pilot signal from a first node to a second node and a third node simultaneously, wherein a distance between the first node and the second node is determined by:
        transmitting a periodic pilot signal from the first node to the second node;
        receiving the periodic pilot signal at the second node;
        retransmitting the received periodic pilot signal from the second node to the first node,
        measuring a roundtrip delay of the pilot signal at the first node, and
        computing a distance between the nodes based at least on the measured roundtrip delay;
    transmitting an additional pilot signal from the second node to the third node and the first node simultaneously;
    in response to receiving the pilot signal at the second node, retransmitting the pilot signal from the second node to the first node and the third node simultaneously;
    in response to receiving the additional pilot signal at the third node, retransmitting the additional pilot signal from the third node to the first node and the second node simultaneously;
    measuring a roundtrip delay of the pilot signal at the first node and the second node;
    measuring a difference between arrival times of the pilot signals at the third node and the first node; and
    determining spatial information with respect to the first, second, and third nodes based at least on the determined distance, the measured roundtrip delays and the measured difference between arrival times of the pilot signal and the additional pilot signal.

2. The method of claim 1, wherein the retransmitted periodic pilot signal includes a phase adjustment in view of an internal processing delay at the second node, the phase adjustment involves matching a phase of the retransmitted periodic pilot signal to a phase of the received periodic pilot signal, and the phase adjustment is accomplished via a cross-correlation between the received periodic pilot signal and the retransmitted periodic pilot signal.

3. The method of claim 1, wherein the transmitting is accomplished via an LED transmitter and wherein the receiving is accomplished via a photodetector.

4. The method of claim 1, wherein the periodic pilot signal and the retransmitted periodic pilot signal are transmitted at different frequencies.

5. A system for determining spatial information for wireless nodes, comprising:
- a plurality of nodes, wherein at least some of the nodes include:
  - a transmitter to broadcast a pilot signal to nodes in the plurality of nodes simultaneously;
  - a receiver to receive a pilot signal from at least one node in the plurality; and
  - a timing module to track transmission and receipt times of pilot signals, wherein the pilot signals comprise at least two pilot signals originating from different nodes simultaneously; and
- a processor to determine unknown spatial information between two nodes based at least in part on common unknown processing delays of intermediate nodes measured by receivers at different nodes.

6. The system of claim 5, wherein the transmitter on at least some of the nodes comprises a light emitting diode (LED).

7. The system of claim 5, wherein the receiver on at least some of the nodes comprises one of:
- a photodiode; and
- a phototransistor.

8. The system of claim 5, wherein the transmitter on at least some of the nodes is omni-directional.

9. The system of claim 5, wherein the receiver on at least some of the nodes is omni-directional.

10. The system of claim 5, comprising:
- a control module to control which nodes are to retransmit a received pilot signal to at least one node in the plurality of nodes.

11. A method for determining location of nodes, comprising:
- transmitting a pilot signal from a first node to a second node and a third node simultaneously, wherein a distance between two of the nodes is known;
- transmitting an additional pilot signal from the second node to the third node and the first node simultaneously;
- in response to receiving the pilot signal at the second node, retransmitting the pilot signal from the second node to the first node and the third node simultaneously;
- in response to receiving the additional pilot signal at the third node, retransmitting the additional pilot signal from the third node to the first node and the second node simultaneously;
- measuring a roundtrip delay of the pilot signal at the first node and the second node;
- measuring a difference between arrival times of the pilot signals and the additional pilot signals at the third node and the first node; and
- determining spatial information with respect to nodes based at least on the known distance, the measured roundtrip delays and the measured difference between arrival times of the pilot signal and the additional pilot signal.

12. The method of claim 11, wherein the pilot signal is an optical pilot signal and wherein transmitting the pilot signal comprises:
- broadcasting the optical pilot signal to the second node and the third node.

13. The method of claim 12, wherein the optical pilot signal is a light emitting diode (LED) signal.

* * * * *

UNITED STATES PATENT AND TRADEMARK OFFICE
CERTIFICATE OF CORRECTION

PATENT NO. : 8,441,620 B2
APPLICATION NO. : 12/754027
DATED : May 14, 2013
INVENTOR(S) : Raul Hernan Etkin et al.

It is certified that error appears in the above-identified patent and that said Letters Patent is hereby corrected as shown below:

In the Claims:

In column 6, line 31, in Claim 1, delete "node," and insert -- node; --, therefor.

In column 6, line 33, in Claim 1, delete "node," and insert -- node; --, therefor.

Signed and Sealed this
First Day of October, 2013

Teresa Stanek Rea
*Deputy Director of the United States Patent and Trademark Office*